(12) United States Patent
Schroeder

(10) Patent No.: US 8,381,770 B2
(45) Date of Patent: Feb. 26, 2013

(54) BLOWOFF TANK

(75) Inventor: Joseph E. Schroeder, Union, MO (US)

(73) Assignee: Nooter/Eriksen, Inc., Fenton, MO (US)

( * ) Notice: Subject to any disclaimer, the term of this patent is extended or adjusted under 35 U.S.C. 154(b) by 647 days.

(21) Appl. No.: 12/600,486

(22) PCT Filed: May 13, 2008

(86) PCT No.: PCT/US2008/063531
§ 371 (c)(1),
(2), (4) Date: Nov. 17, 2009

(87) PCT Pub. No.: WO2008/144313
PCT Pub. Date: Nov. 27, 2008

(65) Prior Publication Data
US 2010/0147393 A1 Jun. 17, 2010

Related U.S. Application Data

(60) Provisional application No. 60/938,853, filed on May 18, 2007.

(51) Int. Cl.
*F16T 1/00* (2006.01)
*F15C 1/16* (2006.01)
*F22B 37/54* (2006.01)
*B01D 45/16* (2006.01)

(52) U.S. Cl. ........ 137/808; 137/177; 137/592; 122/382; 95/219; 55/445

(58) Field of Classification Search .......... 137/590, 137/592, 171, 177, 561 A, 561 R, 808, 809; 122/382; 95/216, 219; 96/187; 55/445
See application file for complete search history.

(56) References Cited

U.S. PATENT DOCUMENTS 1,065,265 A * 6/1913 Nordmark .......... 4/601
(Continued)

FOREIGN PATENT DOCUMENTS

| GB | 2368628 | 5/2002 |
|----|---------|--------|
| JP | 2004113886 | 4/2004 |

OTHER PUBLICATIONS

International Search Report for International Application No. PCT/US2008/063531, mailed Oct. 13, 2009.
(Continued)

*Primary Examiner* — John Rivell
*Assistant Examiner* — Atif Chaudry
(74) *Attorney, Agent, or Firm* — Polster, Lieder, Woodruff & Lucchesi, L.C.

(57) ABSTRACT

A blowoff tank (B) for receiving blowdown, blowoff, and drain water from an HRSG (C) or other type of boiler, so as to lower the temperature of that water enough to enable it to be discharged into a sewer system, includes a generally cylindrical vessel (50) and inlet pipes (60) through which the blowdown, blowoff, and drain water is introduced into the vessel. Each pipe has a radial segment (62) that passes through the sidewall (52) of the vessel, a generally vertical segment (64) that extends upwardly within the vessel, and a tangential segment (68) that opens into the vessel. The radial segment contains a small drain aperture (74). The tank also has a cooling line (90) through which cooling water is introduced into the vessel to lower the temperature of the blowdown, blowoff, and drain water in the vessel and a drain line (86) that drains the mixture of cooling water and blowdown, blowoff, and drain water from the vessel, but never exceeds the elevation of the apertures in the inlet pipes. Thus, once blowdown, blowoff, and draining are completed, water will drain from the inlet pipes and from lines connected to them, all into vessel and thereby reduce a source of corrosion and a cause of water hammer in the lines.

18 Claims, 2 Drawing Sheets

U.S. PATENT DOCUMENTS

| | | | | |
|---|---|---|---|---|
| 1,625,707 A | * | 4/1927 | Caldwell | 122/382 |
| 1,924,771 A | * | 8/1933 | Brown et al. | 4/570 |
| 2,097,648 A | * | 11/1937 | Shaw | 122/382 |
| 2,204,929 A | * | 6/1940 | Fairhurst | 4/611 |
| 3,788,044 A | * | 1/1974 | McNeil | 96/209 |

OTHER PUBLICATIONS

Written Opinion for International Application No. PCT/US2008/063531, mailed Oct. 13, 2009.

* cited by examiner

BLOWOFF TANK

CROSS-REFERENCE TO RELATED APPLICATION

This application derives and claims priority from U.S. provisional application 60/938,853 filed 18 May 2007, which application is incorporated herein by reference.

TECHNICAL FIELD

This invention relates in general to boilers and steam generators and, more particularly, to blowoff tanks for such equipment.

BACKGROUND ART

The gas turbines that power electrical generators discharge exhaust gases at extremely high temperatures. Heat recovery steam generators (HRSGs) extract the heat from the gases to produce steam that powers steam turbines that in turn drive more electrical generators.

The typical HRSG includes multiple sections located one after the other in the flow of hot exhaust gases from a gas turbine. Among these sections are an economizer for elevating the temperature of feed water, an evaporator for converting high temperature water into saturated steam, and a superheater for converting the saturated steam into superheated steam. Many HRSGs have more than one economizer, evaporator, and superheater. Some are equipped with reheaters. The evaporator may be a circulation-type evaporator that has an overhead steam drum from which the steam produced by the evaporator is directed to the superheater. Water circulates through the steam drum as well. On the other hand, the evaporator may be a once-through evaporator that converts water into saturated steam without the steam passing through a steam drum. Water and impurities also collect in the lower regions of the superheater, reheater, and economizer. Unless the water is purged from time to time from the sections of an HRSG, minerals and other impurities may become so concentrated in those sections that they foul the sections or cause foaming that reduces heat transfer. Hence, the sections of an HRSG are provided in their lower regions with valves that, when opened, release water and as to some sections steam as well. Generally, with the exception of overhead steam drums for circulation-type evaporators, the valves are located near the bottom of the HRSG, and that is near grade. When the valves are opened they release drain water.

Steam drums, when present, represent the greatest source of discharged water. The typical steam drum operates at the pressure of the evaporator of which it is a part, and that pressure is considerable. The discharge is continuous in the form of blowdown and at a high velocity. In addition, the typical steam drum has a blowoff port and valve at its bottom for providing intermittent discharges in the form of blowoff that may contain solids.

Regulations governing the use of sewer systems limit the temperature of water that may be discharged into such systems—and the temperature of blowoffs and blowdowns from circulation-type evaporators and drain water from other sections of an HRSG often exceed the high temperature limit. As a consequence, HRSGs are equipped with blowoff tanks where the blowoff and blowdown and also drain water are mixed with cooler water to reduce the temperature of the mixture low enough to comply with sewer regulations.

Other types of boilers experience similar problems. Unless the water in the lower regions of such boilers is purged from time to time through blowoffs, minerals that are initially dissolved in the water become concentrated to the extent that they precipitate as solids. Hence, more traditional boilers may likewise be coupled with blowoff tanks.

The typical blowoff tank A (FIG. 1) that is currently utilized to receive blowoff, blowdown, and drain water from HRSGs, and other boilers as well, includes a vessel 2 of generally cylindrical configuration that is oriented vertically with its lower end only slightly above grade. The tank A has inlets 4 that pass through the side wall of the vessel 2, generally tangentially, at the upper regions of the vessel 2 where the vessel 2 has a liner or wear plate 6 formed from stainless steel. The blowoff and blowdown lines and drain water lines from the various sections of an HRSG are connected to the inlets 4. The tank A also has a primary drain line 8 that originates near the very bottom of the vessel 2, rises within the vessel 2 through its lower region, and emerges from the vessel 2 slightly below the midpoint of the vessel 2. At the very bottom of the vessel 2 a secondary drain line 12 emerges from the vessel 2, but it is normally closed by a valve 14. Both drain lines 8 and 12 lead to a sewer. At its upper end the vessel 2 is fitted with a vent 16 that discharges into the atmosphere.

Blowoff, blowdown, and drain water pass through the blowoff, blowdown, and drain lines and discharge into the vessel 2 at the inlets 4. Here it enters the vessel 2 tangentially along the wear plate 6 and produces a vortex that allows steam that flashes off to escape through the vent 16. The water collects in the vessel 2 and is maintained at an elevation defined as the normal water level. Since at least some of the lines from the HRSG leave the various sections that they purge only slightly above grade and then must rise to the level of the inlets 4 to discharge water into the vessel 2, water becomes trapped in those lines. This may produce water hammer when the valves that purge the sections are opened. Moreover, the trapped water, will corrode the lines. The inlets 4 must accommodate flowing water that is high in temperature and erosive, and thus the inlets are complicated and costly. Moreover, the tangential entry of the inlets 4 into the vessel 2 makes the construction even more complex. When the tank A has multiple inlets 4, it must have increased length and the same holds true for the liner 6 as well.

To avoid the problems created by water trapped in the blowoff, blowdown, and drain lines, sometimes operators of HRSGs will install blowoff tanks A below grade in pits. In that way the water drains from the lines. But pits add expense and make servicing the blowoff tanks difficult.

BEST MODE OF CARRYING OUT THE INVENTION

Figure 1:
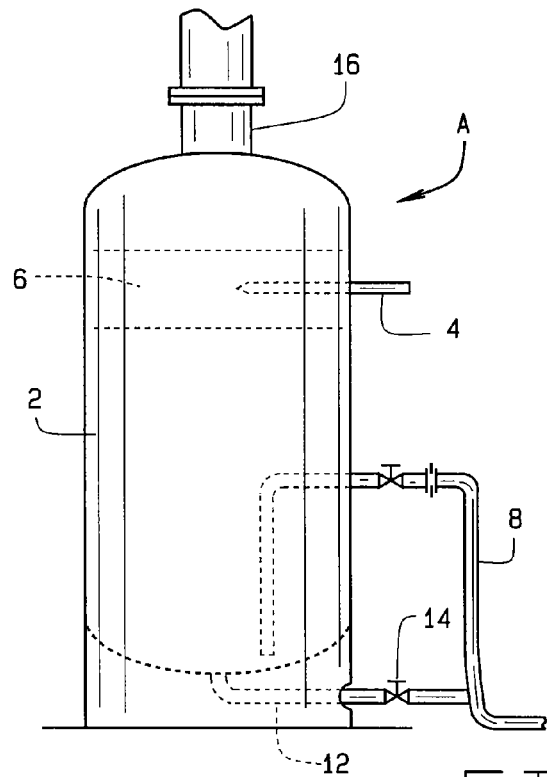
FIG. 1 is a sectional view in elevation of a conventional blowoff tank of the prior art.
Figure 2:
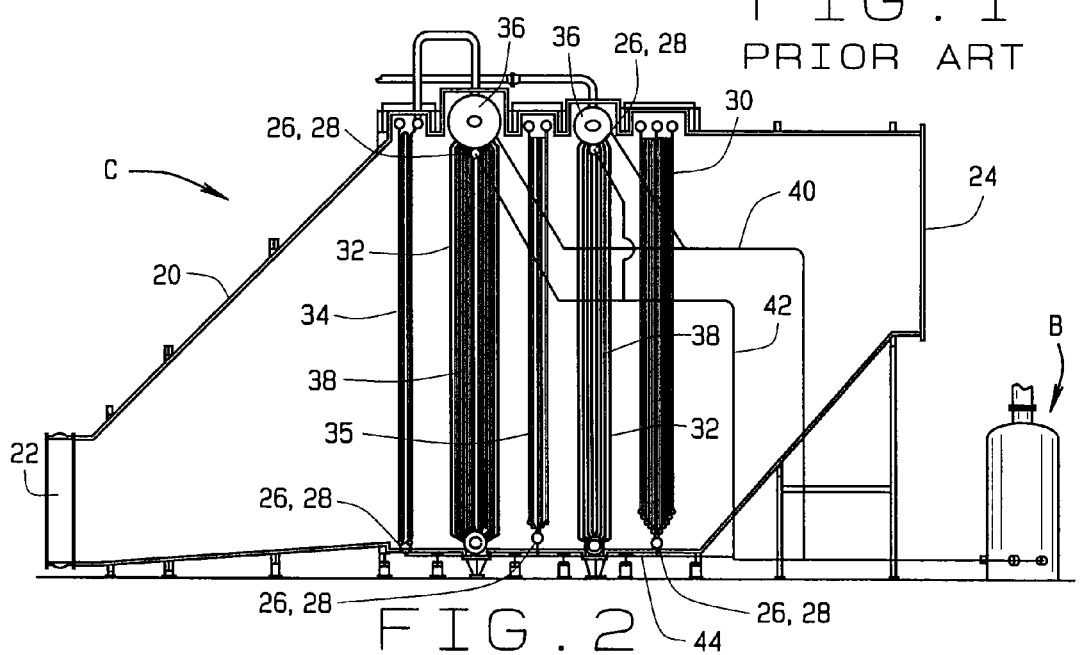
FIG. 2 is an elevation view of the blowoff tank of the present invention connected to an HRSG, with the HRSG being in section to show its major components.

Referring now to the drawings (FIG. 2), a blowoff tank B receives blowoff and blowdown, as well as drain flow, all of which are essentially water in the liquid phase, from a heat recovery steam generator (HRSG) C. In this regard, blowoff is released intermittently, whereas blowdown is a continuous release. Drain flow is also released intermittently, but typically only during startup or shutdown of the HRSG C. The water leaves the HRSG C at elevated temperatures well above the temperatures at which sewer systems are designed to operate. Within the tank B the water cools by loss of heat to the surrounding atmosphere and by being mixed with colder water from an outside source. The water leaves the blowoff tank B and is discharged into a sewer at temperatures below the limits set for the sewer.

The HRSG C is conventional and as such includes (FIG. 2) a duct 20 through which hot gases that are generated by a gas turbine or some other source of heat pass. The duct 20 has an inlet 22 and an outlet 24. Within the duct 20 are several sections, some of which are provided with blowoff ports 26 and blowoff valves 28 for purging the sections of water containing dissolved minerals and other impurities. Among the sections that have blowoff ports 26 and blowoff valves 28 are a feedwater heater or economizer 30, an evaporator 32, and a superheater 34, arranged in that order between the outlet 24 and inlet 26, which is the direction of water and steam flow through them. The HRSG C may also have a reheater 35 provided with at least one blowoff port 26 and valve 28.

If the evaporator 32 is a circulation-type evaporator, it has a steam drum 36 at its upper end and a tube bank 38 within the duct 4 where it is exposed to the hot gases. Heated water from the economizer 30 flows into the steam drum 36 and circulates through the tube bank 38 where some of it transforms into saturated steam. That steam as well as the remaining water rises into the steam drum 36. The saturated steam flows on to the superheater 34 which converts it into superheated steam. The remaining water recirculates through the tube bank 38 along with more water supplied from the economizer 30. Minerals that are dissolved in the water do not follow the steam; they remain with the water and will concentrate in the steam drum 36 unless purged. To this end, the steam drum 36 is equipped with a blowdown line 40 that leads to the blowoff tank B. A continuous flow of water leaves the steam drum 36 through the blowdown line 40, it being discharged under the considerable pressure of the steam within the drum 36 and hence at considerable velocity. The blowdown line 40 prevents the excessive concentration of minerals in the water within the steam drum 36 and tube bank 38. Even so, the drum 36 at its bottom is provided with a blowoff port 26 and blowoff valve 28. Typically, the HRSG C will have several circulation-type evaporators 32 operating at different pressures and will have blowdown lines 40 leading from the steam drums 36 of those evaporators 32.

The blowoff ports 26 through their valves 28, at the bottoms of the steam drums 36, are connected to the blowoff tank B through blowoff lines 42. Unless the valves 28 are opened to purge the drums 36 of water, solid impurities in the water may migrate into the tube banks 38 and damage them.

The blowoff ports 26 at the bottoms of the economizer 30 and superheater 34, as well as at the bottoms of a once-through evaporator and the reheater 35, if either is present, through their respective valves 28 are connected to drain lines 44 that lead to the blowoff tank B. The lines 44 slope downwardly toward the tank B.

Figure 3:
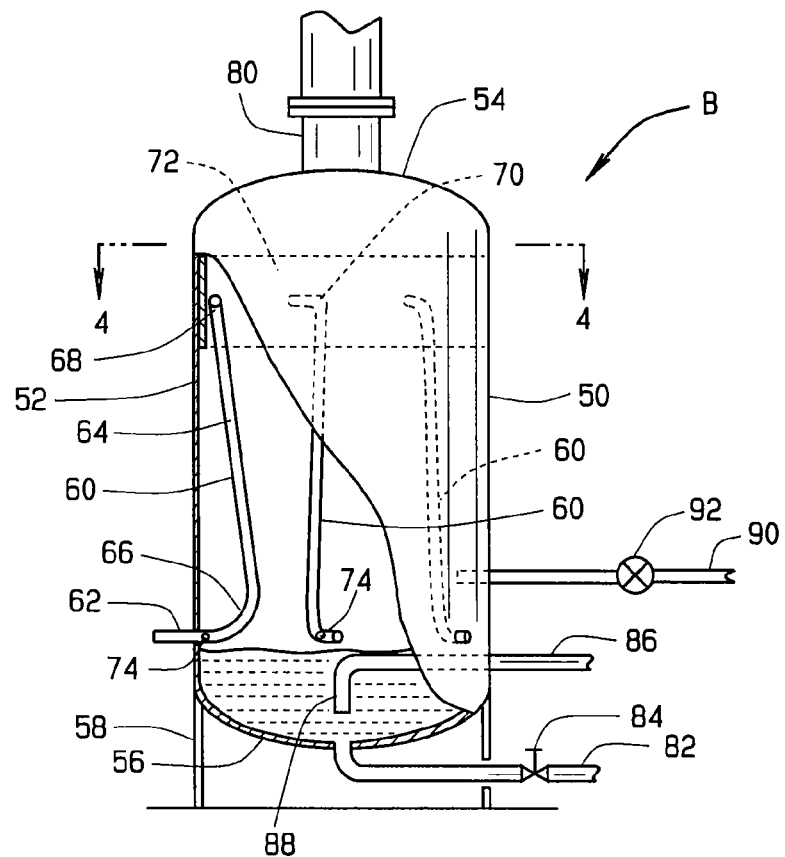
FIG. 3 is an elevational view, partially broken away, of the blowoff tank of the present invention.
Figure 4:
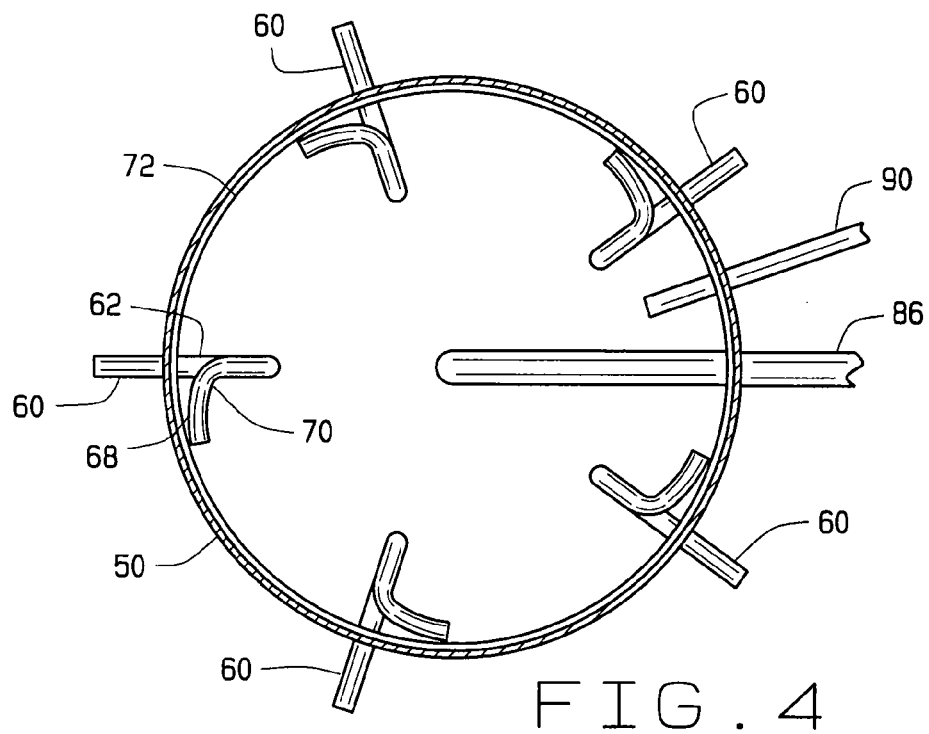
FIG. 4 is a sectional view taken along line 4-4 of FIG. 3.

The blowoff tank B includes (FIGS. 3 and 4) a vessel 50 having a cylindrical side wall 52 and upper and lower end walls 54 and 56, respectively, both of which are preferably dome shaped. The lower end wall 56 is fitted with a short base 58 that rests on a suitable foundation at grade or slightly lower and gives the vessel 50 an upright orientation with its axis extended vertically.

In addition to the vessel 50, the blowoff tank B has several inlet pipes 60 through which water from the blowdown lines 38, the blowoff lines 42, and the drain lines 44, all leading from the HRSG C, enters the tank A. Each inlet pipe 60 includes a radial segment 62 that passes through the side wall 52 of the vessel 50 near the lower end of that wall 52 where it is oriented radially with respect to the wall 52. The radial segment 62 merges into a generally vertical segment 64 at a gentle bend 66 in the pipe 60. The vertical segment 64 lies close to the side wall 52, it being closer to the side wall 52 near its upper end than at its lower end. At its upper end the vertical segment 64 merges into a tangential segment 68 at another gentle bend 70. The tangential segment 68 extends generally horizontally and lies along the upper portion of the side wall 52 perhaps a foot (30 cm) below the upper end wall 54. At the end of the tangential segment 68 the inlet pipe 60 opens into the interior of the vessel 50 such that water discharged from the pipe 60 flows generally horizontally and tangentially with respect to the side wall 52. In this region the vessel 50 has a stainless steel wear plate 72 that serves as a liner for the side wall 52. The radial segment 62, between the sidewall 52 and the gentle bend 66, has an aperture 74 (FIG. 3) that opens into the interior of the vessel 52. The radial segments 62 of the inlet pipes 60 are connected to the blowdown lines 40, the blowoff lines 42, and the drain lines 44. Indeed, each radial segment 62 and the aperture 74 within it, is below the elevation of the line 40, 42, or 44 that it serves and likewise below any valves 28 and ports 26 associate with the segment 62. The inlet pipe 60 is preferably formed from a low chrome carbon steel to withstand high temperatures and erosion. The aperture 74 should be about ⅜ inch (0.96 cm) in diameter.

The tangential segments 68 of all of the inlet pipes 60 are oriented to discharge water in the same direction so as to create a vortex flow within the vessel 50 when the water is discharged. That water, of course, represents the blowoff, blowdown, and drainage from the HRSG C.

The interior of the vessel 50 at its upper end opens to the atmosphere through a vent 80 in the upper end wall 54. The lower end wall 56 has a secondary drain line 82 connected to it at its lowest point, and that line is normally closed by a valve 84. The line 78 leads to a sewer. It serves to completely drain the blowoff tank B when its valve 84 is opened.

But the tank B normally drains through a primary drain line 86 that likewise leads to a sewer. The line 86 leaves the vessel 50 preferably radially through the sidewall 52 at an elevation slightly below the radial segments 62 of the inlet pipes 60, so that the apertures 74 in the segments 62 are above the drain line 86. Within the vessel 50, the drain line 86 turns downwardly in the provision of a vertical segment 88 that terminates close to the lower end wall 56. Here water within the vessel 50 enters the primary drain line 86. Actually, the primary drain line 86 may leave the tank at a much lower elevation—and indeed, may be so low that the vertical segment 88 is unnecessary—but nowhere should it rise to an elevation greater than the radial segments 62 of the inlet pipes 60, so that water that accumulates in the tank B will eventually come to a level below the apertures 74 in the inlet pipes 60.

Finally, the tank B has a cooling water inlet 90 that is connected to a source of water at ambient temperature. The inlet 90 is fitted with a valve 92 that controls the flow of cooler water into the vessel 50 where it mixes with the high temperature water introduced into the vessel through the inlet pipes 60.

In the operation of the HRSG C and the blowoff tank B that services it, water circulates through the economizers 30 and the evaporators 32 and other equipment, whereas steam for the most part circulates through the superheater 30. Even so, this water and steam will leave concentrations of minerals and other impurities in the equipment, unless purged from time to time. In the economizers 38, the minerals for the most part pass through them, but some impurities can accumulate in their lower regions. In the superheater 34, impurities may also collect in its lower region, particularly after the HRSG C is shut down. But the evaporator 32 represents the greatest source of impurities that must be purged. As water is converted into steam in the evaporator 32 minerals that are dissolved in the water remain with the water and concentrate. In a circulation-type evaporator 32, the concentration occurs in the steam drum 36 of the evaporator 32. But the continuous discharge of water that passes out through the blowdown line 40 normally prevents the accumulation from becoming excessive. Even so, impurities may collect in the bottom of the drum 36. To remove the impurities from the economizer 30, from the drum of the circulation-type evaporator 32 or from the bottom region of a once-through evaporator, from the superheater 34, and from the reheater 35, the blowoff valves 28 at their lower regions are opened from time to time, usually once a day, discharging water or steam or both in the form of blowoff or drainage.

In any event, the water that represents the blowoff, blowdown, and drainage passes through the lines 40, 42, and 44 to the inlet pipes 60 of the blowoff tank B, entering the tank B at the radial segments 62 of those pipes 60. In this regard, the blowoff ports 26 and valves 28 and the lines 40, 42, and 44 all lie at an elevation greater than the radial segments 62 of the inlet pipes 60. Nowhere do the lines 40, 42, and 44 dip below the radial segments 62 of the pipes 60.

When any blowoff valve 28 is opened, water from its port 26 discharges into the line 40, 42, or 44 with which it is connected and flows through that line, sometimes at considerable velocity. The water in the blowdown lines 40, having been discharged from the steam drums 36 under considerable pressure, flows to and discharges through the tangential segments 68 at high velocity. The water that represents blowoff when the valves 28 at the bottoms of the steam drums 36 are opened flows at high velocity through the blowoff lines 42 to likewise discharge into the vessel 50 through the tangential segments 68. Drainage from the superheater 34 and reheater may also flow at high velocity through the drain lines 44 and discharge into the vessel 50 through the tangential segments 68. Upon discharging from the tangential segments 68 the water impinges against the wear plate 72 and undergoes a vortex-type flow in the upper region of the vessel 50. Some steam flashes off at the discharge from the tangential segments 68, owing to the decrease in pressure, and the vortex flow facilitates the separation of the steam from the water. The steam escapes through the vent 80.

The water of the blowoff, blowdown, and drainage descends into the bottom of the vessel 50 where it mixes with cooler water introduced through the line 90. Indeed, enough cool water exists to drop the temperature of the water that accumulates in the bottom of the vessel 50 to below that which is acceptable for sewer systems. With the introduction of blowoff into the tank B, the level of water in the vessel 50 may rise above the primary drain line 86. The cooler water in the very bottom of the vessel 50 flows into the vertical segment 88 of the primary drain line 86 and leaves the vessel 50 through the line 86, to be discharged into a sewer at an acceptable temperature.

But blowoff occurs only intermittently, perhaps once a day, and the blowdown alone is not enough to raise the level above the maximum elevation of the primary drain line 86. Consequently, the water in the vessel 50 normally remains below the radial segments 62 of the inlet pipes 60. Since the segments 62 lie below the blowoff ports 26 and the blowoff lines 42 leading from then, no water accumulates in the blowoff lines 42. The same holds true for the drain lines 44. This eliminates corrosion from the blowoff and drain water and just as importantly avoids water hammer and accompanying mechanical shocks when the blowoff valves 28 are opened.

While the blowoff tank B as described and illustrated services an HRSG, it may service other types of boilers as well.

The invention claimed is:

1. In combination with a boiler having a blowoff line, a blowoff tank comprising:
    a vessel;
    at least one inlet pipe connected to the blowoff line of the boiler for introducing water from the blowoff line of the boiler into the vessel, the inlet pipe entering the vessel, then extending upwardly within the vessel, and then turning generally horizontally, the pipe having an aperture that lies at an elevation lower than the blowoff line and opens into the vessel at the lowest region of the pipe; and
    a drain line that opens into the bottom of the vessel and leads out of the vessel, the drain line being at an elevation lower than the aperture in the inlet pipe, so that water will drain from the inlet pipe into the vessel, all such that the normal water level in the vessel is below the aperture.

2. The combination according to claim 1 wherein the vessel has an upright sidewall and the inlet pipe enters the vessel generally perpendicular to the sidewall.

3. The combination according to claim 1 wherein the vessel has a cylindrical sidewall that is generally vertical, and the inlet pipe has a radial segment at which it enters the vessel, with the radial segment being generally perpendicular to the sidewall where it enters the vessel.

4. The combination according to claim 3 where the aperture is in the radial segment.

5. The combination according to claim 4 wherein the inlet pipe has a generally vertical segment into which the radial segment merges and a tangential segment into which the vertical segment merges.

6. The combination according to claim 5 wherein the inlet pipe also has a gentle bend where the radial and vertical segments merge and another gentle bend where the vertical and tangential segments merge.

7. The combination according to claim 5 wherein the inlet pipe is one of several inlet pipes, with all of the inlet pipes having their tangential segments oriented in the same direction.

8. The combination according to claim 7 wherein the boiler comprises an HRSG having blowdown, blowoff, and drain lines leading to the inlet pipes of the blowoff tank; and wherein the blowdown, blowoff, and drain lines are at an elevation higher than the radial segments of the inlet pipes.

9. The combination according to claim 3 wherein the vessel also has a bottom wall and the drain line opens into the vessel near the bottom wall.

10. A blowoff tank comprising:
    a vessel having a side wall;
    at least one inlet pipe for introducing water from the blowdown, blowoff, or drainage of a boiler into the vessel, the inlet pipe extending upwardly at side wall of the vessel, and opening into the vessel along the side wall such that it discharges generally horizontally along the side wall, the inlet pipe having a drain aperture that opens into the vessel at the lowest region of the pipe; and
    a drain line that opens into the bottom of the vessel and leads out of the vessel, the drain line being at an elevation lower than the drain aperture in the inlet pipe, so that water will drain from the inlet pipe into the vessel, all such that the normal water level in the vessel is below the aperture.

11. A blowoff tank according to claim 10 wherein the vessel has a cylindrical side wall that is generally vertical, and the inlet pipe has a tangential segment where it discharges into the vessel.

12. A blowoff tank according to claim 11 wherein the inlet pipe has a radial segment that enters the vessel and the aperture is in the radial segment.

13. A blowoff tank according to claim 12 in combination with an HRSG having blowdown, blowoff, and drain lines that are at an elevation higher than the radial segment of the inlet pipe.

14. A blowoff tank according to claim 11 wherein the inlet pipe is one of several inlet pipes, with all of the inlet pipes having their tangential segments oriented in the same direction.

15. A blowoff tank according to claim 10 in combination with a boiler having a blowoff line that leads to the inlet pipe of the tank; and wherein the blowoff line lies at an elevation higher than the aperture in the inlet pipe.

16. A process for reducing the temperature of water discharged from a boiler as blowdown or blowoff or drainage, said process comprising:
    releasing water from the boiler;
    directing the water toward a vessel at an elevation below the elevation at which the water is released from the boiler, the vessel having a side wall;
    thereafter directing the water upwardly;
    discharging the water into the vessel generally horizontally along the side wall;
    allowing the water to descend to the bottom of the vessel;
    draining the water from the vessel through a drain line that lies at an elevation below the elevation at which the water is introduced into the vessel, all such that the normal water level in the vessel is below the elevation at which the water is introduced into the vessel; and
    draining some water from the boiler into the vessel without directing it upwardly and at an elevation that is higher than the elevation at which water is drained from the vessel.

17. The process according to claim 16 wherein the water is directed upwardly within the vessel.

18. The process according to claim 16 wherein the side wall is generally cylindrical and the water is discharged generally tangentially along the side wall.

* * * * *